United States Patent
Gudipati et al.

(10) Patent No.: US 12,482,277 B2
(45) Date of Patent: Nov. 25, 2025

(54) SYSTEM AND METHOD FOR READING LICENSE PLATE FROM AN IMAGE USING AN ENSEMBLE METHOD OF ALPR SYSTEMS

(71) Applicant: Conduent Business Services, LLC, Florham Park, NJ (US)

(72) Inventors: Neeraj Gudipati, Hyderabad (IN); Vinuta Vishweshwar Gayatri, Karnataka (IN)

(73) Assignee: Conduent Business Services, LLC, Florham Park, NJ (US)

( * ) Notice: Subject to any disclaimer, the term of this patent is extended or adjusted under 35 U.S.C. 154(b) by 424 days.

(21) Appl. No.: 17/881,195

(22) Filed: Aug. 4, 2022

(65) Prior Publication Data

US 2024/0046666 A1 Feb. 8, 2024

(51) Int. Cl.
*G06V 10/82* (2022.01)
*G06T 7/00* (2017.01)
*G06V 20/62* (2022.01)

(52) U.S. Cl.
CPC .......... *G06V 20/625* (2022.01); *G06T 7/0004* (2013.01); *G06T 2207/20081* (2013.01); *G06T 2207/20084* (2013.01); *G06T 2207/30248* (2013.01)

(58) Field of Classification Search
CPC ...... G06V 20/625; G06V 10/82; G06V 20/62; G06T 7/0004; G06T 2207/20081; G06T 2207/20084; G06T 2207/30248
See application file for complete search history.

(56) References Cited

U.S. PATENT DOCUMENTS

| | | | |
|---|---|---|---|
| 9,641,806 B2 | 5/2017 | Smith | |
| 10,019,640 B2 * | 7/2018 | Almeida | G06V 10/811 |
| 11,030,472 B2 | 6/2021 | Alakarhu | |
| 11,188,776 B2 | 11/2021 | Blais-Morin et al. | |
| 11,321,571 B2 | 5/2022 | Crary et al. | |
| 11,361,380 B2 | 6/2022 | Kelsh et al. | |
| 2019/0066492 A1 * | 2/2019 | Nijhuis | G06V 20/52 |

FOREIGN PATENT DOCUMENTS

EP  2169460 A2 *  3/2010  ............ G03B 13/20

OTHER PUBLICATIONS

Gupta, Zero Shot License Plate Re-Identification, 2019 IEEE Winter Conference on Applications of Computer Vision (Year: 2019).*

(Continued)

*Primary Examiner* — Vu Le
*Assistant Examiner* — Lei Zhao
(74) *Attorney, Agent, or Firm* — KPPB Law; Kermit D. Lopez; Luis M. Ortiz

(57) ABSTRACT

Methods and systems of license plate recognition can involve subjecting an image captured by an image capturing device to image-processing by a group of different license plate recognition engines including a license plate recognition engine and a license plate reidentification engine, and using a decision tree to combine data from the license plate recognition engine and the license plate reidentification engine and generate a license plate identifier based on the data processed by the decision tree.

13 Claims, 3 Drawing Sheets

(56) References Cited

OTHER PUBLICATIONS

Abhinav Kumar, et al., "Neural Signatures for Licence Plate Re-identification", arXiv:1712.00282v1 [cs.CV] Dec. 1, 2017.
"Software Engine", Wikipedia, Retrieved from "https://en.wikipedia.org/w/index.php?title=Software_engine&oldid=1086301082", page last edited on May 5, 2022, at 10:50 (UTC).
Gupta, Mayank & Kumar, Abhinav & Madhvanath, Sriganesh (2019), Zero Shot License Plate Re-Identification. 773-781. 10.1109/WACV.2019.00087.

* cited by examiner

SYSTEM AND METHOD FOR READING LICENSE PLATE FROM AN IMAGE USING AN ENSEMBLE METHOD OF ALPR SYSTEMS

TECHNICAL FIELD

Embodiments are related to automatic license plate recognition (ALPR) methods, systems, and devices.

BACKGROUND

ALPR is an image-processing approach that often functions as the core module of "intelligent" transportation infrastructure applications. License plate recognition techniques, such as ALPR, can be employed to identify a vehicle by automatically reading a license plate utilizing image processing, computer vision, and character recognition technologies. A license plate recognition operation can be performed by locating a license plate in an image, segmenting the characters in the captured image of the plate, and performing an OCR (Optical Character Recognition) operation with respect to the characters identified.

ALPR systems generally include the use of one or more image capturing devices such as, for example, a high speed camera with an infrared ("IR") filter or two cameras—one high resolution digital camera and one IR camera—to capture images of license plates. A typical ALPR system includes a processor and an application capable of performing sophisticated OCR to transform the image of the plate into alphanumeric characters; along with application software to compare the transformed license plate characters to databases of license plates of interest to law enforcement; and a user interface to display the images captured, the results of the OCR transformation.

The ALPR problem may be decomposed into a sequence of image processing operation, for example: locating the sub-image containing the license plate (i.e., plate localization), extracting images of individual characters (i.e., segmentation), and performing optical character recognition (OCR) on these character images. The ability to extract license plate information from images and/or videos is fundamental to the many transportation business. Having an ALPR solution can provide significant improvements for the efficiency and throughput for a number of transportation related processes.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for improved ALPR methods and systems.

It is another aspect of the embodiments to provide for an ensemble ALPR method and system involving the use of different types of ALPR engines.

It is a further aspect of the embodiments to provide for ensemble ALPR method and system that includes the use of a template-based ALPR solution in association with one or more other different types of ALPR engines.

It is also an aspect of the embodiments to provide for the combination of outputs of different ALPR systems in order to get the best prediction of a license plate identifier.

It is an additional aspect of the embodiments to provide for an ALPR system that uses at least two different ALPR methods and their outputs to construct the input to an ensemble model which can output the best prediction of a license plate identifier.

The aforementioned aspects and other objectives and advantages can now be achieved as described herein. In an embodiment, a method of license plate recognition, can involve subjecting an image captured by an image capturing device to image-processing by a plurality of different license plate recognition engines including a license plate recognition engine and a license plate reidentification engine; and using a decision tree to combine data from the license plate recognition engine and the license plate reidentification engine and generate a license plate identifier based on the data processed by the decision tree.

In an embodiment, the license plate reidentification engine can include a template-based ALPR solution.

In an embodiment, the license plate reidentification engine can comprise a template-based ALPR solution that encodes the image and text found in the image using a plurality of neural networks.

In an embodiment, the plurality of neural networks can include two or more different shallow neural networks.

An embodiment can involve using a distance of the image encoding from each text encoding to determine a nearest license plate match.

In an embodiment, the license plate reidentification engine can include a template-based ALPR solution that encodes the image and text found in the image using a plurality of neural networks that includes two or more different shallow neural networks.

In another embodiment, a method of license plate recognition, can involve: subjecting an image captured by an image capturing device to image-processing by a plurality of different license plate recognition engines including a license plate recognition engine and a license plate reidentification engine, wherein the license plate reidentification engine comprises a template-based ALPR solution; and using a decision tree to combine data from the license plate recognition engine and the license plate reidentification engine and generate a license plate identifier based on the data processed by the decision tree.

In another embodiment, a system for license plate recognition can include: an image capturing device, wherein an image captured by the image capturing device is subject to image-processing by a plurality of different license plate recognition engines including a license plate recognition engine and a license plate reidentification engine; and a decision tree that combines data from the license plate recognition engine and the license plate reidentification engine and generates a license plate identifier based on the data processed by the decision tree.

In an embodiment of the system, the license plate reidentification engine can include a template-based ALPR solution.

In an embodiment of the system, the license plate reidentification engine can include a template-based ALPR solution that encodes the image and text found in the image using a plurality of neural networks.

In an embodiment of the system, the plurality of neural networks can include two or more different shallow neural networks.

In an embodiment of the system, a distance of the image encoding from each text encoding can be used to determine a nearest license plate match.

In an embodiment of the system, the image capturing device can include one or more of: a high speed camera with an infrared filter or at least two cameras including a high resolution digital camera and an infrared camera.

In another embodiment, a system for license plate recognition, can comprise: at least one processor and a memory, the memory storing instructions to cause the at least one processor to perform: subjecting an image captured by an image capturing device to image-processing by a plurality of different license plate recognition engines including a license plate recognition engine and a license plate reidentification engine; and using a decision tree to combine data from the license plate recognition engine and the license plate reidentification engine and generate a license plate identifier based on the data processed by the decision tree. The license plate reidentification engine can comprise a template-based ALPR solution that encodes the image and text found in the image using a plurality of neural networks, and the plurality of neural networks can include at least two different shallow neural networks. Furthermore, a distance of the image encoding from each text encoding can be used to determine a nearest license plate match.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the embodiments.

DETAILED DESCRIPTION

Figure 1:
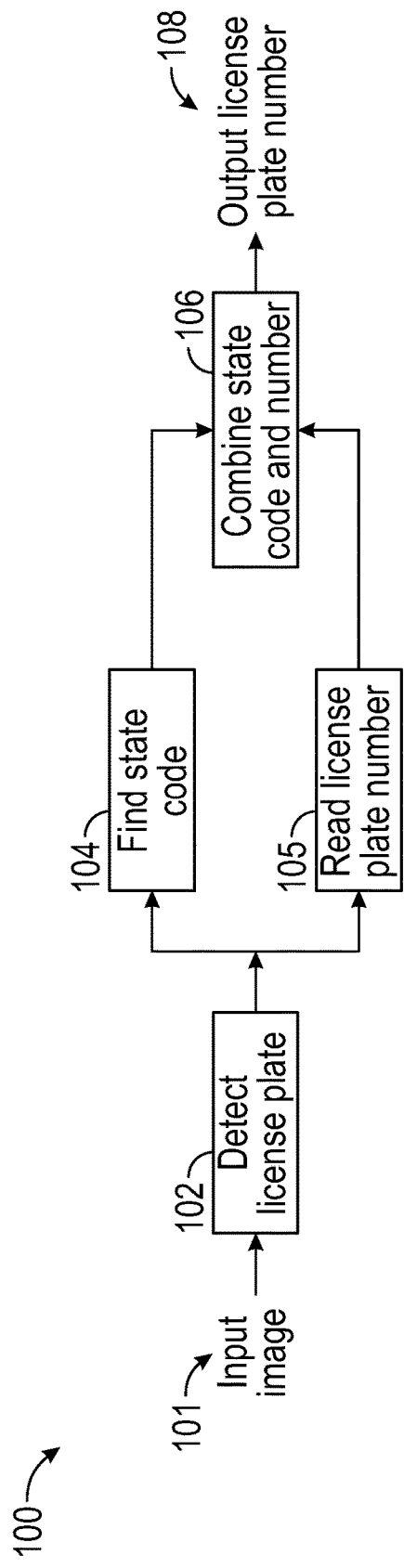
FIG. 1 illustrates a flow diagram depicting logical operational steps of a method for implementing an ALPR system, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

After reading this description it will become apparent how to implement the embodiments described in various alternative implementations. Further, although various embodiments are described herein, it is understood that these embodiments are presented by way of example only, and not limitation. As such, this detailed description of various alternative embodiments should not be construed to limit the scope or breadth of the appended claims.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. In addition, terms or phrases such as "at least one" may refer to "one or more". For example, "at least one widget" may refer to "one or more widgets".

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively can be referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

An example of a data processing system or device is a server. The term 'server' as utilized herein can relate to a software or hardware device that can accept and respond to requests made over a network. The device that makes the request, and receives a response from the server, is called a client. On the Internet, the term "server" commonly refers to the computer system that receives requests for a web files and sends those files to the client.

The term 'image' as utilized herein relates to a digital image, which is an image composed of picture elements, also known as pixels, each with finite, discrete quantities of numeric representation for its intensity or gray level that is an output from its two-dimensional functions fed as input by its spatial coordinates denoted with x, y on the x-axis and y-axis, respectively.

Note that the term 'infrastructure' as utilized herein can relate to the underlying structure of a country, region, municipality, and its economy, including but not limited to fixed installations including roads, bridges, dams, water and sewer system, railways, subways, airports, harbors, and the like.

The embodiments relate to simple and effective artificial intelligence (AI) based infrastructure damage methods, systems, and devices. Noting that a public vehicle fleet covering a transportation network can be exploited inexpensively and passively (i.e. without manual interventions) to take streams of video of the roads (possibly with other sensor reading, e.g., accelerometer, gyroscope) while the vehicles make their journeys, the disclosed embodiments propose to monitor these road conditions primarily with a computer vision application (note that the disclosed approach is not limited only to public transportation fleet, but is broad enough and sufficiently applicable to heterogeneous fleet systems including, for example, public and privately owned vehicles).

Note that the term 'model' as utilized herein relates to AI models including constructing machines that can simulate human intelligence. An AI model is a program or algorithm that can utilize a set of data that can enable it to recognize certain patterns. This allows it to reach a conclusion or make a prediction when provided with sufficient information.

FIG. 1 illustrates a flow diagram depicting logical operational steps of a method 100 for implementing an ALPR system, in accordance with an embodiment. As shown at block 102, a step or operation can be implemented to detect a license plate in an input image 101. Next, a step or operation can be implemented to find a state code in the input image 101, as shown at block 104. In addition, the license plate number can be read in the input image 101, as indicated at block 105. Thereafter, a step or operation can be implemented to combine the state code and number, as shown at block 106 followed by output 108 of the license plate number.

The problem of reading the license plate numbers from the image of a vehicle thus can involve the following steps:

1. Detecting/localizing the license plate in the image (block 101 and block 102)
2. Determining the state code/area code of the license plate (block 104)
3. Reading the numbers on the license plates (block 105)
4. Combining the results from steps 2 and 3

FIG. 1 thus illustrates the framework of an ALPR solution that follows the above mentioned steps.

There is a slightly different problem called Automatic License Plate Reidentification, in which, the list of license plate numbers are already available. Given an input image, the system has to output a license plate number from the available list, which is closest to the license plate in the image. The list of license plate numbers are called templates. This can be posed as an Automatic License Plate Recognition problem if a large number of templates are generated by using different combinations of characters and digits. A solution to this problem was proposed in the work of Gupta, Mayank & Kumar, Abhinav & Madhvanath, Sriganesh (2019), *Zero Shot License Plate Re-Identification*. 773-781. 10.1109/WACV.2019.00087, which is incorporated herein by reference in its entirety.

Figure 2:
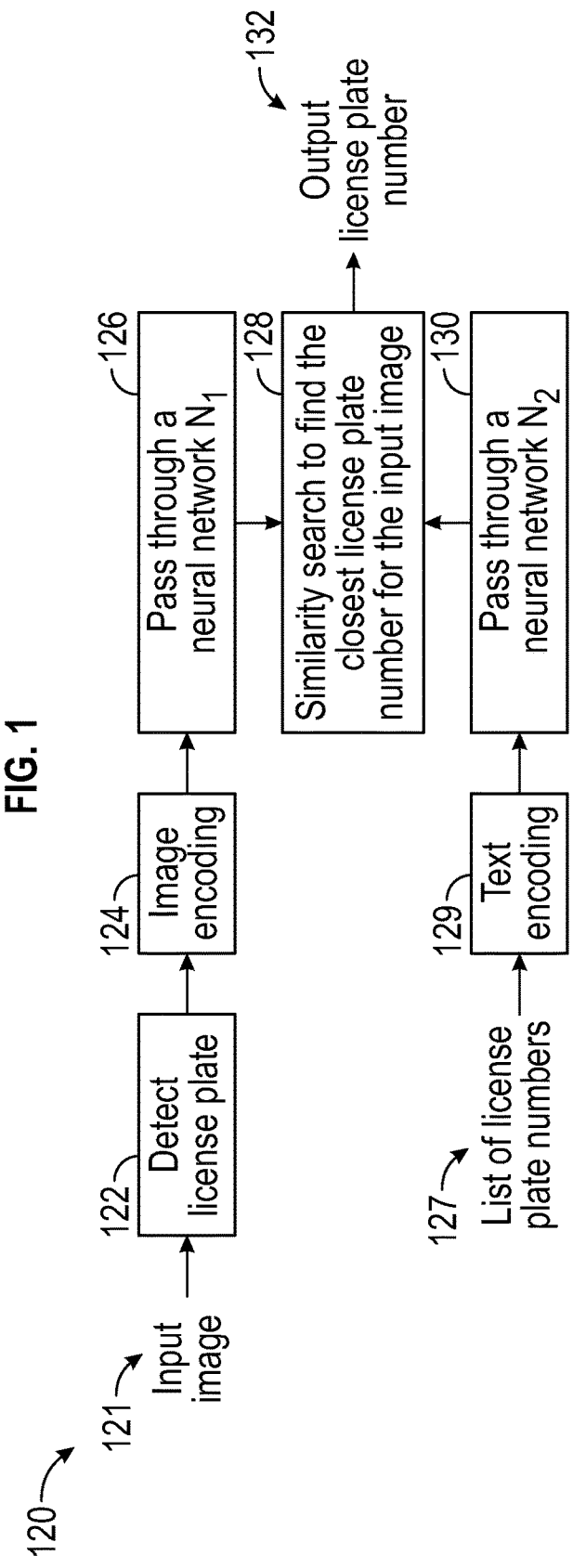
FIG. 2 illustrates a flow diagram depicting logical operational steps of a template-based ALPR method/solution, in accordance with an embodiment.

FIG. 2 illustrates a flow diagram of a method 120, which can follow this approach. We can refer to this approach as a template-based ALPR solution. As shown at block 122, a step or operation can be implemented to detect a license plate in an input image 121. Thereafter, as shown at block 124 a step or operation can be implemented to encode the image 121. Then, as indicated at block 126, a step or operation can be implemented to pass the encoded image through a first neural network N1. Then, a step or operation can be implemented as depicted at block 128 to perform a similarity search to find the closest license plate number for the input image 121.

The method 120 can also involve text encoding, as indicated at block 129, with respect to a list of license plate numbers 127. The results of the text encoding operation depicted at block 129 can be passed through a second neural network N2, as shown at block 130. The results can be then processed according to the similarity search operation shown at block 128.

A great deal of research has been performed in solving these problems, but the demand for high accuracy ALPR systems has continued. Since ALPR systems are used in applications such as surveillance, law enforcement etc., they are required to perform with high degree of accuracy. Instead of using a single model or method, we can combine the outputs of different ALPR models in order to obtain the best result. This can be achieved by using an ensemble method. Ensemble methods perform as good as or better than any of the individual models.

We can make the following two contributions for the embodiments:

1. A novel algorithm to combine the outputs of different ALPR systems in order to get the best prediction
2. A system that uses two different ALPR methods, uses their outputs to construct the input to an ensemble model which outputs the best prediction.

The advantage of the system is that the algorithm is very easy to implement and it is easy to train the decision tree model used in the ensemble method. It is also very efficient in terms of memory requirements and processing speed, which improves the underlying ALPR technology. An example of a decision tree can be implemented in this context is the decision tree 146 shown in FIG. 4 and described in FIG. 3 with respect to block 146.

We can thus use two different ALPR algorithms: 1. An OCR (optical character recognition) algorithm; and 2. a template-based ALPR solution. In the template-based ALPR solution, the image and the license plate number in text format can be encoded using two different shallow neural networks N1 and N2 such as shown in FIG. 2. We can precompute the text encodings for a list of license plate numbers available and store them like a database. When there is an input image, the image encoding (see block 124 in FIG. 2) can be computed and the distance (Euclidian distance or cosine distance) of the image encoding from each of the text encodings available in the database (also known as template) is computed and the nearest match is found out. The license plate numbers corresponding to the top-3 nearest matches can be considered for the ensemble method.

We can use a decision tree to combine the outputs from the two ALPR algorithms mentioned above. The distance values of the top-3 template-based ALPR solution results and the confidence value of the OCR output can be used to construct a vector which becomes the input to the decision tree. The output can be a single integer in the range [1, 4]. This number can be an index to the list of license plate number outputs from the two ALPR algorithms used. 1, 2 and 3 can correspond to the top-3 template-based ALPR Solution outputs and 4 can correspond to the OCR output.

The decision tree can be trained using a few thousand training samples. The training samples are generated by passing the images through the two systems—OCR and Template-based ALPR Solution—and the output index is determined by the ground truth label. We use only those samples for which at least one of the four outputs match the ground truth plate number.

The construction of the input vector to the decision tree, can be performed as follows. A list $L=[l_1, l_2, l_3]$ can be constructed using the output license plate numbers from Template-based ALPR Solution. Then a 4-d one-hot vector $v_i$ can be constructed for each element $I_i$ of L, in which the ith entry is the distance value of the corresponding label from Template-based ALPR Solution. If OCR output label $l_j$ is not same as one of the Template-based ALPR Solution outputs, it is appended to the list L. Another 4-d one-hot vector is constructed with the jth entry being the OCR output confidence value. The four one-hot vectors are appended to one another to form a 16-d vector which becomes the input vector to the decision tree.

Figure 3:
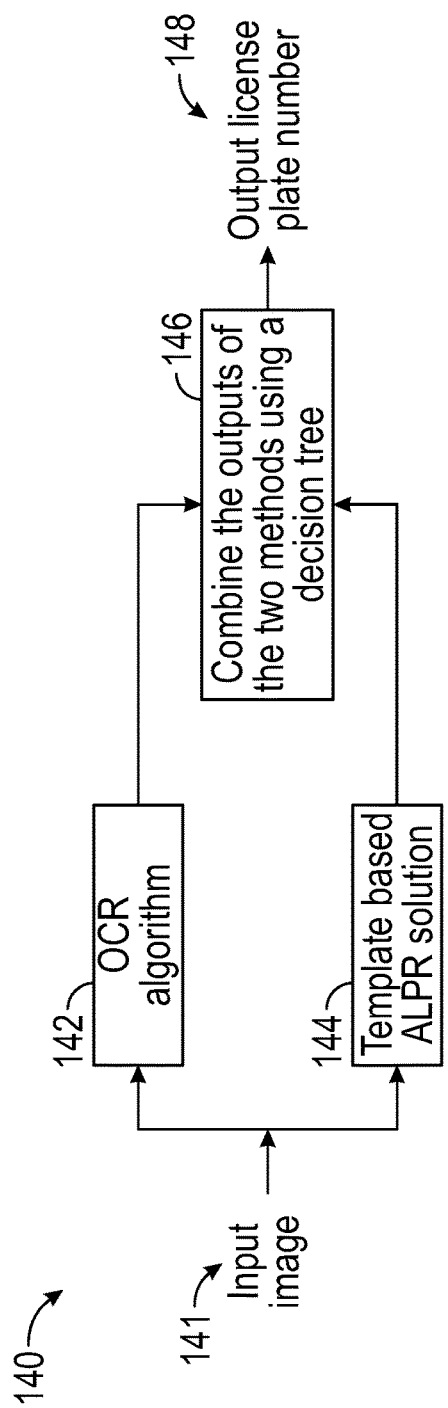
FIG. 3 illustrates a flow diagram depicting logical operational steps of an ensemble ALPR method, in accordance with an embodiment.

FIG. 3 illustrates a flow diagram of a method 140 for implementing an ALPR ensemble system, in accordance with an embodiment. As shown at block 142, an OCR step or operation can be implemented as shown at block 142, with respect to the input image 141. Note that the step/operation(s) shown at block 142 can be implemented as or by an OCR engine. That is, block 142 can represent an OCR engine. Note that the term 'engine' as utilized herein can relate to a software engine, which is a component of a software system.

A template-based ALPR solution, as shown at block 144, can be performed with respect to the input image 141. That is, the step/operation(s) shown at block 144 can represent a template-based ALPR engine that can implement a template-based ALPR solution, such as discussed earlier. The outputs of the engines indicated at block 142 and block 144 can be combined using the previously discussed decision tree, as shown at block 146. A license plate number 148 can then be output. FIG. 3 thus illustrates a flow diagram of the proposed solution, in accordance with an embodiment.

Figure 4:
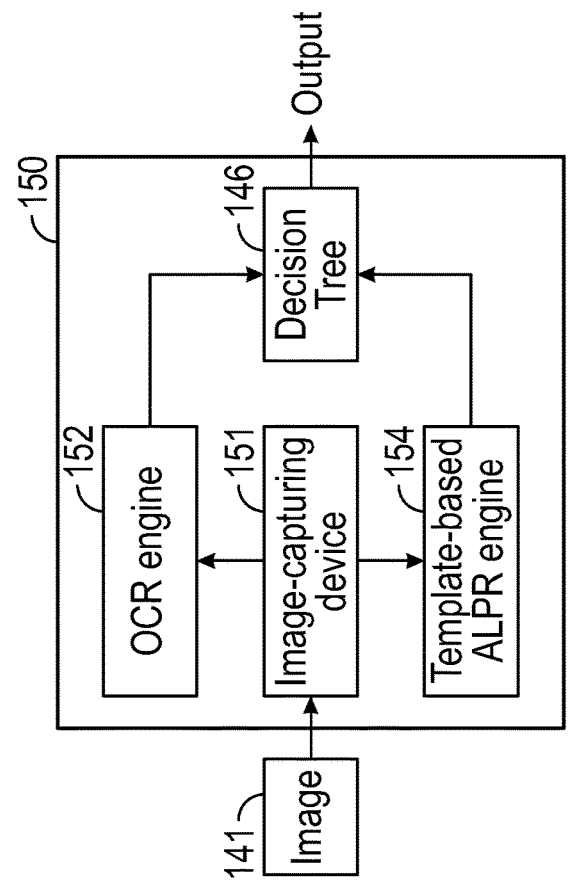
FIG. 4 illustrates a block diagram of an ensemble ALPR system, in accordance with an embodiment.

FIG. 4 illustrates a block diagram of an ensemble ALPR system 150, in accordance with an embodiment. The ALPR system 150 can include an image capturing device 151 that can capture an image 141. The image capturing device 151 can be, for example, a digital video camera (e.g., a high speed camera), an IR camera, and so on. The image capturing device 151 may be an ALPR camera such as utilized in ALPR systems. The image 141 (or images/video, etc.) captured by the image capturing device 151 is subject to image-processing by both the OCR engine 152 and the template-based ALPR engine 154. In some embodiments, the image capturing device 151 can be a high speed camera with an infrared filter or at least two cameras including a high resolution digital camera and an infrared camera.

Non-limiting examples of devices including ALPR cameras and ALPR readers, which can be used to implement the image capturing device 151 are disclosed in U.S. Pat. Nos. 9,641,806 and 11,030,472, which are incorporated herein by reference in their entireties.

Note that the template-based ALPR engine 154 may implement a template-based ALPR solution such as the template-based ALPR solution shown at block 144 in FIG. 3 and discussed elsewhere herein. Similarly, the OCR engine 152 may implement OCR operations such as shown at block 142 in FIG. 3 and discussed elsewhere herein. The image 141 captured by the image capturing device 151 and subject to image-processing by the OCR engine 152 and the template-based ALPR engine 154 can be then provided to a decision tree 146, which can be used to combine the outputs of the OCR engine 152 and the template-based ALPR engine 154, as discussed previously, to output a license plate identifier (e.g., a license plate number).

All the steps of a proposed ensemble model algorithm are formally presented in Algorithm1.

---

Algorithm1: An algorithm to combine the outputs of two different ALPR models - OCR and Template-based ALPR Solution - to give the best prediction

---

Input: An image of a vehicle in which the license plate is clearly visible
Output: The license plate number of the vehicle
Step1: The input image is passed through a license plate detector and the
  ROI(Region of Interest) of the license plate is obtained
Step2: The ROI is passed through Template-based ALPR Solution to
obtain the top-3 results $l_1$, $l_2$ and $l_3$ and the respective
  distance values $d_1$, $d_2$ and $d_3$
Step3: The ROI is passed through an OCR engine to obtain the output
  label $l_4$ and the confidence value $d_4$
Step4: A vector v is constructed as per Algorithm2, using $d_1$, $d_2$, $d_3$ and $d_4$
as inputs
Step5: The vector v is given as input to the decision tree model M to
obtain an output i
Step6: If i=1, the output is $l_1$ ,
  Else, if i=2, the output is $l_2$ ,
  Else, if i=3, the output is $l_3$ ,
  Else, the output is $l_4$

---

Algorithm2: An algorithm to generate input vector v to the
proposed decision tree model using the output from the
two ALPR systems - OCR and Template-based ALPR Solution

---

Input: Top-3 Template-based ALPR Solution outputs and their
corresponding distance values $(l_1, d_1)$, $(l_2, d_2)$, $(l_3, d_3)$ and the OCR output
$(l_4, d_4)$
Output: A 16-d vector v
Step1: Construct a list of plate numbers L = $[l_1, l_2, l_3, l_4]$
Step2: If ($l_4==l_1$ or $l_4==l_2$ or $l_4==l_3$): change L to $[l_1, l_2, l_3]$
Step3: Initialize a 4x4 array V with zeroes.
Step4: For i = 1 to 3: V[i, i] = $d_i$ -continued Algorithm2: An algorithm to generate input vector v to the
proposed decision tree model using the output from the
two ALPR systems - OCR and Template-based ALPR Solution Step5: If ($l_4$==$l_1$): V[4, 1] = $d_4$
  Else, if ($l_4$==$l_2$): V[4, 2] = $d_4$
  Else, if ($l_4$==$l_3$): V[4, 3] = $d_4$
  Else, V[4, 4] = $d_4$
Step6: Vectorize the matrix V by appending the rows one after the other to get a 16-d vector v
Step7: Output the vector v When an experiment was run on a test set containing 55178 images, the accuracy was increased by nearly 4% when compared to the best results obtained by either of the two underlying algorithms. The results are summarized in Table 1 below:

TABLE 1

Summary of Results
Total number of images: 55178

| Type | Accuracy |
| --- | --- |
| OCR | 90.036% |
| Template-Based ALPR Solution | 86.741% |
| Ensemble Method | 93.958% |

There has not been an approach of combining results from different methods to get the best prediction of a license plate. This is the first such attempt at increasing the accuracy of the ALPR system. In addition, the following are advantages of the disclosed method. This is a simple, yet elegant method to increase the accuracy of the ALPR system. The processing time required to get the output using this approach is very less. This approach is very efficient in terms of memory and processing power as a light weight decision tree model is being used. A sophisticated hardware like a GPU is not required to implement this method. Training the decision tree model is very fast and it requires very less training samples.

The embodiments are described at least in part herein with reference to the flowchart illustrations, steps and/or block diagrams of methods, systems, and computer program products and data structures and scripts. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus and may create means for implementing the functions/acts specified in the block or blocks.

To be clear, the disclosed embodiments can be implemented in some cases in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of features may be considered a special-purpose computer designed with a purpose of image processing images captured by an image capturing device, such as discussed herein. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments, such as the steps, operations or instructions described herein.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means, which can implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks herein.

The flow charts and block diagrams in the figure can illustrate the architecture, the functionality, and the operation of possible implementations of systems, methods, and computer program products according to various embodiments (e.g., preferred or alternative embodiments). In this regard, each block in the flow chart or block diagrams may represent a module, a segment, or a portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 5:
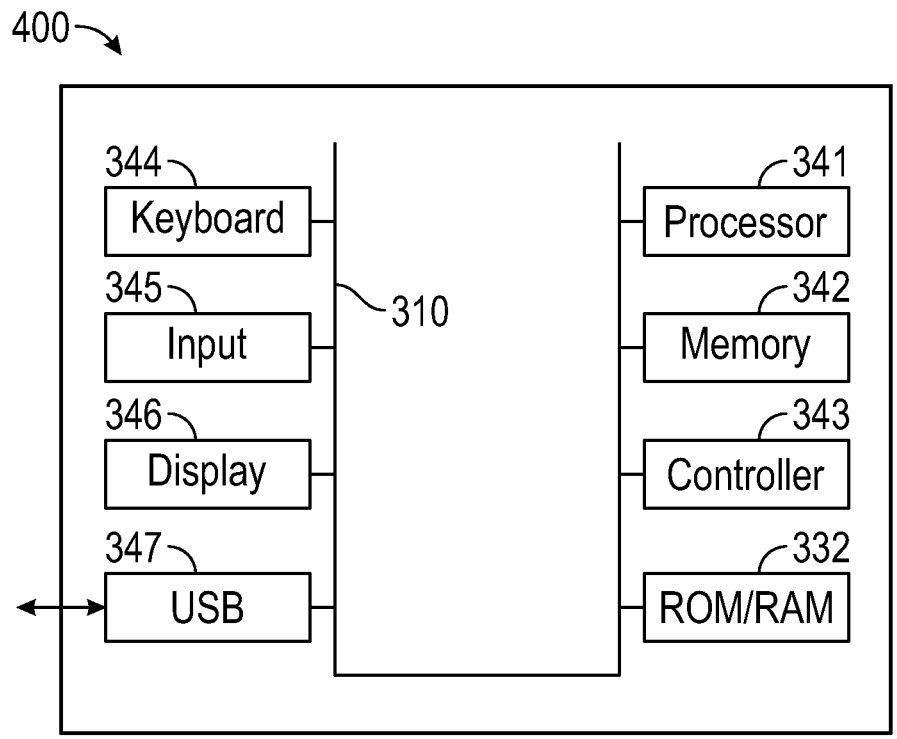
FIG. 5 illustrates a schematic view of a data-processing system, in accordance with an embodiment.
Figure 6:
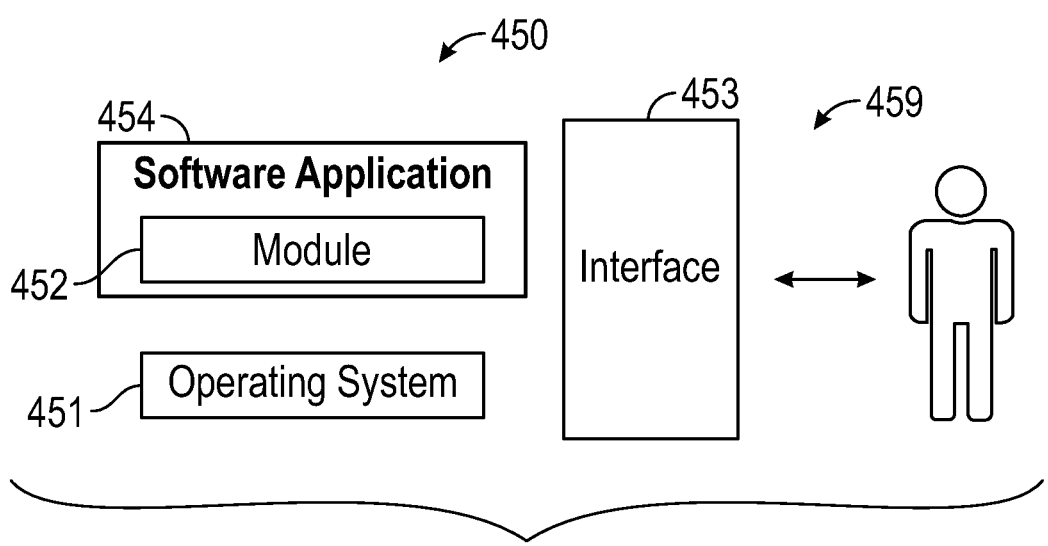
FIG. 6 illustrates a schematic view of a software system including a module, an operating system, and a user interface, in accordance with an embodiment.

FIG. 5 and FIG. 6 are shown only as exemplary diagrams of data-processing environments in which example embodiments may be implemented. It should be appreciated that FIG. 5 and FIG. 6 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 5, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.) and/or other peripheral connections and components.

A system bus 310 can serve as a main electronic information highway interconnecting the other illustrated components of the hardware of data-processing system 400. The system bus 310 can function as a communication system that transfers data between components inside the data-processing system 400 (e.g., a computer), or between computers. The system bus 310 can include all related hardware components (e.g., wire, optical fiber, etc.) and software, including communication protocols.

In some embodiments, the processor 341 may be a CPU that functions as the central processing unit of the data-processing system 400, performing calculations and logic operations required to execute a program. Read only memory (ROM) and random access memory (RAM) of the ROM/RAM 344 constitute examples of non-transitory computer-readable storage media.

The controller 343 can interface with one or more optional non-transitory computer-readable storage media to the system bus 310. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium.

As illustrated, the various components of data-processing system 400 can communicate electronically through a system bus 310 or similar architecture. The system bus 310 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc.). The data-processing system 400 can also communicate with other devices and systems. For example, the data-processing system 400 may communicate with the image capturing device 151 shown in FIG. 4 and can store and process, for example, the OCR engine 152, the template-based ALPR engine 154, and the decision tree 146 shown in FIG. 4, and the various steps/operations, modules, and algorithms disclosed herein, including variations thereof.

FIG. 6 illustrates a computer software system 450 for directing the operation of the data-processing system 400 depicted in FIG. 5. The software application 454, may be stored for example in memory 342 and/or another memory and can include one or more modules such as the module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the various steps, instructions, operations, engines and algorithms discussed herein. For example, the module 452 can implement the steps, operations and instructions illustrated and described herein with respect to the various blocks shown in the figures herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Examples of modules are shown in the figures herein. For example, the method 140 shown in FIG. 3 may be implemented as a module or a group of modules. Alternatively, each of the operations/steps shown in FIG. 3 may be implemented as a module. For example, the OCR algorithm shown at block 142, the template-based solution 144, and the combining operation indicated at block 146 depicted in FIG. 3 may be implemented as modules. Similarly, Algorithm1 and Algorithm2, and so on, as discussed herein, may be implemented in the context of a module or a group of modules.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module as utilized may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the data-processing system 400 shown in FIG. 5.

The disclosed embodiments can constitute an improvement to a computer system (e.g., such as the data-processing system 400 shown in FIG. 5) rather than simply the use of the computer system as a tool. The disclosed modules, instructions, steps and functionalities discussed herein can result in a specific improvement over prior systems, resulting in improved data-processing systems.

FIG. 5 and FIG. 6 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein as shown in FIG. 1, FIG. 2, and FIG. 3 can be performed in a different order. Similarly, the various steps and operations of the disclosed example algorithms discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

Based on the foregoing, it can be appreciated that a number of different embodiments are disclosed herein. For example, in one embodiment, a method of license plate recognition, can involve subjecting an image captured by an image capturing device to image-processing by a plurality of different license plate recognition engines including a license plate recognition engine and a license plate reidentification engine; and using a decision tree to combine data from the license plate recognition engine and the license plate reidentification engine and generate a license plate identifier based on the data processed by the decision tree.

In an embodiment of the method, the license plate reidentification engine can include a template-based ALPR solution.

In an embodiment of the method, the license plate reidentification engine can comprise a template-based ALPR solution that encodes the image and text found in the image using a plurality of neural networks.

In an embodiment of the method, the plurality of neural networks can include two or more different shallow neural networks.

An embodiment of the method can involve using a distance of the image encoding from each text encoding to determine a nearest license plate match.

In an embodiment of the method, the license plate reidentification engine can include a template-based ALPR solution that encodes the image and text found in the image using a plurality of neural networks that includes two or more different shallow neural networks.

In another embodiment, a method of license plate recognition, can involve: subjecting an image captured by an image capturing device to image-processing by a plurality of different license plate recognition engines including a license plate recognition engine and a license plate reidentification engine, wherein the license plate reidentification engine comprises a template-based ALPR solution; and using a decision tree to combine data from the license plate recognition engine and the license plate reidentification engine and generate a license plate identifier based on the data processed by the decision tree.

In another embodiment, a system for license plate recognition can include: an image capturing device, wherein an image captured by the image capturing device is subject to image-processing by a plurality of different license plate recognition engines including a license plate recognition engine and a license plate reidentification engine; and a decision tree that combines data from the license plate recognition engine and the license plate reidentification engine and generates a license plate identifier based on the data processed by the decision tree.

In an embodiment of the system, the license plate reidentification engine can include a template-based ALPR solution.

In an embodiment of the system, the license plate reidentification engine can include a template-based ALPR solution that encodes the image and text found in the image using a plurality of neural networks.

In an embodiment of the system, the plurality of neural networks can include two or more different shallow neural networks.

In an embodiment of the system, a distance of the image encoding from each text encoding can be used to determine a nearest license plate match.

In an embodiment of the system, the image capturing device can include one or more of: a high speed camera with an infrared filter or at least two cameras including a high resolution digital camera and an infrared camera.

In yet another embodiment, a system for license plate recognition, can comprise: at least one processor and a memory, the memory storing instructions to cause the at least one processor to perform: subjecting an image captured by an image capturing device to image-processing by a plurality of different license plate recognition engines including a license plate recognition engine and a license plate reidentification engine; and using a decision tree to combine data from the license plate recognition engine and the license plate reidentification engine and generate a license plate identifier based on the data processed by the decision tree. The license plate reidentification engine can comprise a template-based ALPR solution that encodes the image and text found in the image using a plurality of neural networks, and the plurality of neural networks can include at least two different shallow neural networks. Furthermore, a distance of the image encoding from each text encoding can be used to determine a nearest license plate match.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of license plate recognition, comprising: subjecting an image captured by an image capturing device to image-processing by a plurality of different license plate recognition engines including a license plate recognition engine and a license plate reidentification engine, the image capturing device comprising an Automatic License Plate Recognition (ALPR) camera and the license plate reidentification engine comprising a template-based ALPR solution that encodes the image and text found in the image using a plurality of neural networks including at least two different neural networks; outputting distance values of the top-3 template-based ALPR solution results and a confidence value of an output of the license plate recognition engine to construct at least a 16-dimensional vector which becomes an input to a decision tree; and using the decision tree to combine data output from the license plate recognition engine and the license plate reidentification engine and generate a license plate identifier based on the data input to and processed by the decision tree, the data input to the decision tree including an input vector.

2. The method of claim 1 further comprising constructing the input vector to the decision tree by:
collecting multiple candidate license plate numbers from the template-based ALPR solution;
generating a set of feature vectors based on distance values associated with the candidate license plate numbers;
including an additional candidate license plate number from an OCR output if it is not already present among the template-based ALPR solution outputs;
constructing a feature vector for the OCR output based on its confidence value; and
combining the feature vectors into a single input vector that represents both the template-based ALPR solution and the OCR output, wherein the input vector is used by the decision tree to generate the license plate identifier.

3. The method of claim 2 wherein the decision tree generates an output value corresponding to a single integer within a predefined range, wherein the integer serves as an index to a list of license plate number outputs from the license plate recognition engine and the license plate reidentification engine, and wherein the index selects one of the top-ranked results from the template-based ALPR solution or the OCR output as the license plate identifier.

4. The method of claim 2 further comprising determining a nearest license plate match by calculating a distance between an image encoding generated by the template-based ALPR solution and each corresponding text encoding, wherein the distance is used to select a most likely license plate identifier.

5. The method of claim 4 further comprising capturing the image with the ALPR camera, wherein the ALPR camera comprises a high speed camera with an infrared filter or at least two cameras including a high resolution digital camera and an infrared camera.

6. The method of claim 1 further comprising constructing the input vector to the decision tree by:
generating feature vectors based on distance values from the template-based ALPR solution and confidence values from an OCR output; and
combining the feature vectors into a single input vector for processing by the decision tree.

7. The method of claim 6 wherein the at least two different neural networks comprises at least two different shallow neural networks.

8. The method of claim 6 further comprising using a distance of the image encoding from each text encoding to determine a nearest license plate match, wherein the distance comprises the distance values.

9. A method of license plate recognition, comprising: subjecting an image captured by an image capturing device to image-processing by a plurality of different license plate recognition engines including a license plate recognition engine and a license plate reidentification engine, wherein the license plate reidentification engine comprises a template-based ALPR solution, the image capturing device comprising an Automatic License Plate Recognition (ALPR) camera comprising a high speed camera with an infrared filter or at least two cameras including a high resolution digital camera and an infrared camera; using a decision tree to combine data output from the license plate recognition engine and the license plate reidentification engine and generate a license plate identifier based on the data input to and processed by the decision tree, the data input to the decision tree including at least an 16-dimensional input vector; and constructing an input vector for the decision tree by processing outputs from the template-based ALPR solution and the license plate recognition engine, wherein the input vector includes distance values of top-ranked template-based ALPR solution results and confidence values from the license plate recognition engine; and using the decision tree to generate a license plate identifier by selecting an index corresponding to one of the top-ranked template-based ALPR outputs or an OCR-derived output, wherein the index represents the most probable license plate match.

10. The method of claim 9 wherein the template-based ALPR solution encodes the image and text found in the image using a plurality of neural networks.

11. The method of claim 10 wherein the plurality of neural networks comprises at least two different shallow neural networks.

12. The method of claim 10 further comprising using a distance of the image encoding from each text encoding to determine a nearest license plate match.

13. An ensemble automatic license plate recognition (ALPR) system of license plate recognition, comprising: an image capturing device comprising an ALPR camera including a high speed camera with an infrared filter or at least two cameras including a high resolution digital camera and an infrared camera, wherein an image captured by the image capturing device is subject to image-processing by a plurality of different license plate recognition engines including a license plate recognition engine and a license plate reidentification engine, wherein the license plate reidentification engine comprises a template-based ALPR solution that encodes the image and text found in the image using a plurality of neural network; a processor operable to construct an input vector for a decision tree by processing outputs from the template-based ALPR solution and the license plate recognition engine, wherein the input vector includes distance values of top-ranked template-based ALPR solution results and confidence values from the license plate recognition engine; and the decision tree configured to generate a license plate identifier by selecting an index corresponding to one of the top-ranked template-based ALPR outputs or an OCR-derived output, wherein the index represents the most probable license plate match, wherein the decision tree combines data from the license plate recognition engine and the license plate reidentification engine and generates a license plate identifier based on the data processed by the decision tree, the data input to the decision tree including the input vector comprising at least a 16-dimensional vector.

* * * * *